Feb. 6, 1968
R. M. BLUCK
3,367,817
METHOD AND APPARATUS FOR FORMING
A ROCKET NOZZLE STRUCTURE
Filed Oct. 14, 1963
3 Sheets-Sheet 1
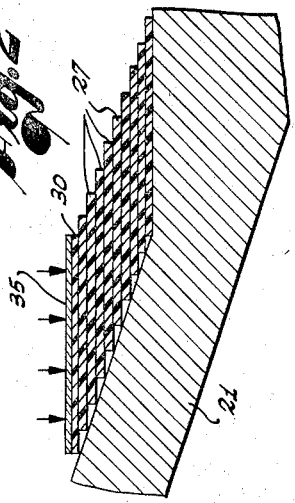
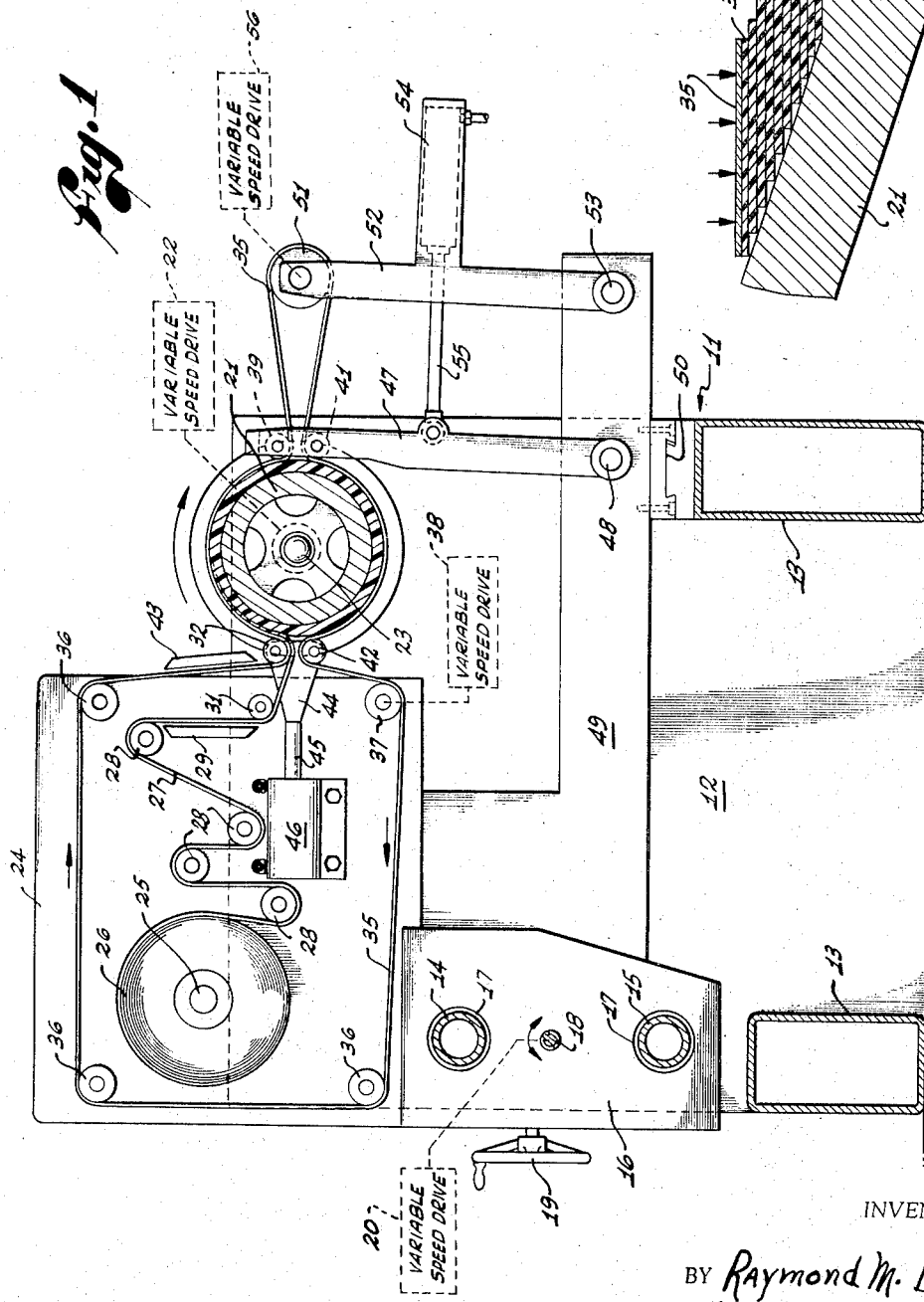
INVENTOR.
BY Raymond M. Bluck
James E. Cooney
Attorney Feb. 6, 1968
R. M. BLUCK
3,367,817
METHOD AND APPARATUS FOR FORMING
A ROCKET NOZZLE STRUCTURE
Filed Oct. 14, 1963
3 Sheets-Sheet 2
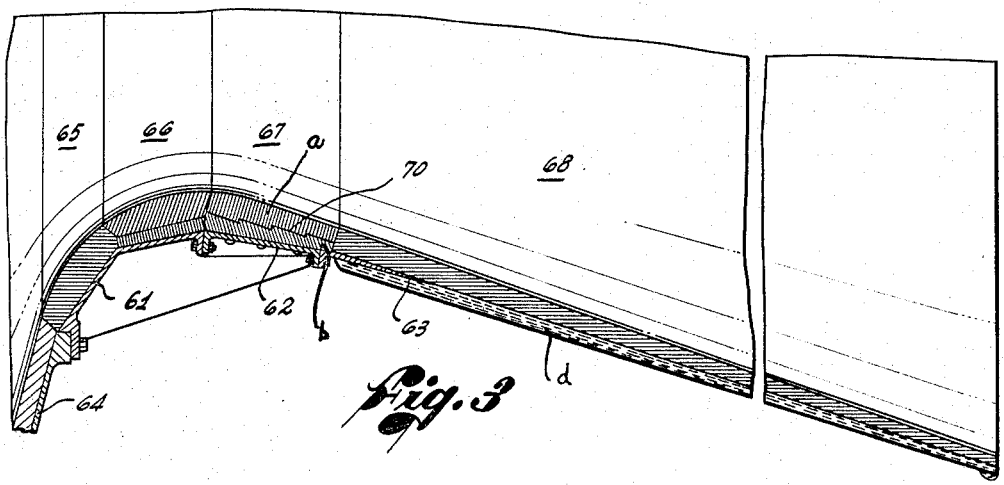
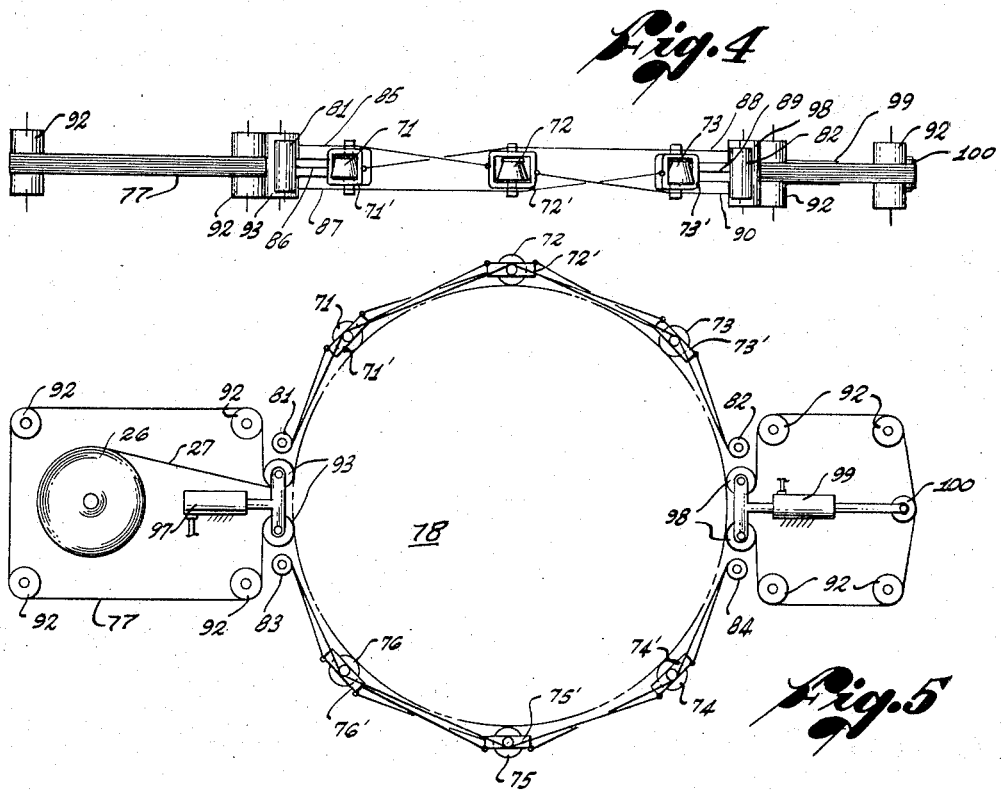
INVENTOR.
BY Raymond M. Bluck
James E. Cooney
Attorney Feb. 6, 1968  R. M. BLUCK  3,367,817
METHOD AND APPARATUS FOR FORMING
A ROCKET NOZZLE STRUCTURE
Filed Oct. 14, 1963  3 Sheets-Sheet 3

INVENTOR.
BY Raymond M. Bluck
James E. Toomey
Attorney

United States Patent Office 3,367,817
Patented Feb. 6, 1968

3,367,817
METHOD AND APPARATUS FOR FORMING A ROCKET NOZZLE STRUCTURE
Raymond M. Bluck, Winona, Minn., assignor, by mesne assignments, to Kaiser Aerospace & Electronics Corporation, Oakland, Calif., a corporation of Nevada
Filed Oct. 14, 1963, Ser. No. 315,852
8 Claims. (Cl. 156—195)

The present invention relates generally to fiber matrix structures with a matrix binder cured by simultaneous application of heat and pressure, and more particularly to insulation and ablation components for rocket propulsion systems and re-entry vehicles.

The fiber matrix from which the structures of the present invention are constructed is preferably in the form of a band, ribbon or tape of fiber impregnated with an uncured matrix binder. This tape is helically wound upon a form or mandrel in a multiplicity of progressive layers, with a substantially continuous application of heat and pressure during winding. The tape layers are consolidated to final density by softening the matrix binder to a fluid consistency under heat and pressure, resulting in a close nesting of the fiber matrix.

In the molding of large, relatively thick-walled, fiber matrix structures such as those used for insulation and ablation components, presently used techniques require extremely large presses or heated pressure vessels for curing. These in turn require high-capacity heat exchangers to provide the necessary rates of temperature increase. The present invention provides for the manufacture of such large components without using presmolding or pressure vessel curing and thus eliminates the need for excessively heavy equipment involving hydroclaves, autoclaves, presses and matched molding dies, and in addition can effect a significant reduction in the rate of heat input and the total heat required.

In constructing a fiber matrix component according to a preferred embodiment of the present invention, the binder impregnated fiber tape is preheated by suitable means and helically wound on a heated mandrel or form in a multiplicity of progressive, overlapped layers which may vary, by way of example only, between 10 and 20 layers in the overlap. Heat and pressure are applied to the outer layer substantially continuously by suitable heat and pressure applying means such as by means of an endless tension band which may be of solid steel, mesh strap, a plurality of aligned cables, or by a series of suitably mounted and heated rollers, which form a substantially continuous heat and pressure applying band surrounding the mandrel. The mesh and cable straps may be coated to a flat surface with a flexible material such as polytetrafluoroethylene. Pressure is applied to the overlapped layers of the fiber tape between the tension band and the mandrel and the fiber tape is both preheated and heated by conduction from the tension band at the outside and the mandrel from the inside, both the tension band and the mandrel preferably being heated. The matrix binder is thereby softened to a fluid consistency under the application of heat and pressure, and the material is consolidated to final density with close nesting of the fiber matrix.

The curing time must be greater than the time required for one revolution of the mandrel and less than the time required for the number of revolutions necessary to complete the overlap. The minimum time is established to insure cross-polymerization of the matrix binder between successive layers, and a maximum time is established to limit the depth of uncured material to insure that pressure applied by the tension band is effective to the full depth of active polymerization. This limited depth of uncured material is also desired so that a firm base for reacting to band pressure is established progressively. Thus, by the practice of the instant invention and depending upon the tape and binder materials used, the curing of these materials in situ can take place in a matter of seconds or minutes, such as 50 seconds to 400 seconds, by way of example, whereas the present practice of manufacturing plastic rocket nozzle parts by the hydroclave process requires many hours of curing time.

The fibrous materials used for the matrix may include fibrous inorganic refractories, such as silicon dioxide, zirconium dioxide, asbestos, fiber glass, aluminum oxide and refractory metal wire, or may alternately comprise, or include together therewith, fibrous organic materials, such as graphite, carbon, nylon and other synthetic fibers. The matrix binder materials may include all types of thermosetting resins, such as phenolic, silicone and epoxy resins and rubber base elastomers, such as buna-N and nitrile elastomers, e.g., as derived from acrylo-nitrile and inorganic materials, such as inorganic polymers.

Among other features and advantages, the present invention overcomes many of the major problems encountered in the molding of large, thick-walled structures from a fiber matrix and a binder therefor. The invention secures substantially uniform pressure distribution which is readily measurable and is uniformly effective since the depth of layer in transient cure is relatively constant. It provides a substantially uniform temperature gradient by applying a uniform rate of heating to a thin tape which is controllable for uniform heat input per unit weight of material. It provides a short path escape for resin condensation products and entrapped air since the surface cure generates volatiles only to a shallow depth and excess matrix binder flows toward the outer edge of the tension band away from the mandrel surface.

As a further advantage, the rapid cure of the matrix filler in the process according to the present invention tends to maintain uniformity of matrix fiber and filler distribution since de-bulking or consolidation is effected as each layer is applied to minimize movement of fibers.

The process and product of the present invention are substantially unlimited as to size and permit the attainment of monolithic structures of large size, thus lessening the segmentation required. Unitary structures up to 260 inches in diameter and 280 inches long are well within the scope of the presently contemplated products to be constructed according to the present invention and even larger structures are attainable within the inventive concept.

While certain objects, features and advantages of the present invention have been specifically pointed out, others will become apparent from the following specification and the appended drawings, in which:

FIG. 1 is a diagrammatic representation of a structural embodiment according to the present invention;

FIG. 2 is a fragmentary, longitudinal sectional of the mandrel showing the application of the matrix tape layers and tension band thereto;

FIG. 3 is a partial sectional view through a rocket nozzle constructed according to the present invention;

FIG. 4 is a partial diagrammatic plan view of another structural embodiment according to the present invention;

FIG. 5 is a diagrammatic elevational view of the embodiment of FIG. 4;

Figure 6:
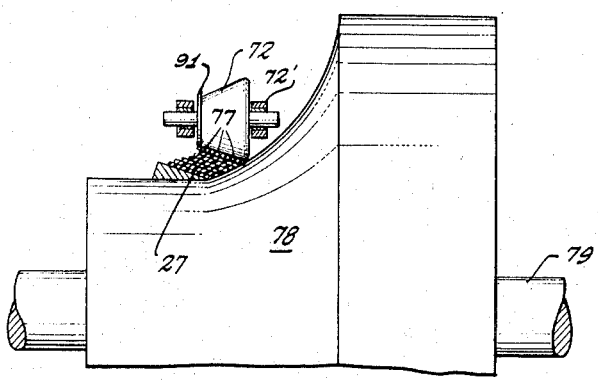
FIG. 6 is a diagrammatic representation of the operation of the embodiment of FIGS. 4 and 5 on one form of mandrel.

In the physical embodiment of the invention diagrammatically illustrated in FIG. 1, there is provided an elongated base indicated generally at 11 and including spaced supporting structures 12 at its opposite ends joined by bottom hollow beams 13. Between the supporting structures 12 is mounted a pair of stationary tubular supports 14 and 15 upon which is slidably mounted, for movement longitudinally of the base, a rigid carriage 16 on bearings 17. A rotatable lead screw 18 passes through the carriage 16 and is selectively coupled thereto by a conventional split-nut clutching arrangement, not shown. A manual drive wheel 19 may be selectively connected to traverse the carriage 16 manually on the supporting tubes 14 and 15. The lead screw 18 may be conventionally driven in either direction by a variable speed drive indicated diagrammatically at 20.

A mandrel or form 21, preferably hollow, and having an exterior surface on which is shaped the interior of the molded structure, is mounted for rotation from one or both of the end supports 12 by any convenient means, for example, in a conventional lathe head stock, not shown. The mandrel is desirably driven by a variable speed drive indicated diagrammatically at 22. A heat source 23 employing any suitable supply, electrical, combustion, radiation, steam, etc., is disposed within the hollow center of the mandrel 21 to heat it.

A support 24 is rigidly mounted on the carriage 16 to be movable therewith longitudinally of the base. On the support 24 is mounted a horizontal shaft 25 which rotatably carries a supply roll 26 of the binder impregnated fiber matrix tape 27. This tape 27 feeds from the roll 26 over a plurality of idler, drag or drive rolls 28 to pass in front of a radiant or other suitable tape heating device 29 and thence over rollers 31 and 32 to the surface of the mandrel 21.

A tension band 35 advantageously travels about the support 24 over idler rollers 36 and a friction drive roller 37 driven by a variable speed drive diagrammatically illustrated at 38. The tension band 35 is shown in FIGS. 1 and 2 as an endless solid steel strap passing over rollers 32, 39, 41 and 42 which serve to hold the band and press it against the outer surface of the outer layer of the fiber matrix tape. The band 35 passes in front of a radiant or other heater 43 just before it contacts the surface of the matrix tape. Additional heating devices 43 for maintaining the proper heat in the band 35 to effect the desired matrix tape curing may be located at strategic points about the outer periphery of the mandrel 21. The matrix tape 27 passes around the tensioning wheel 32 inside of the band 35 so that it will be disposed interiorly thereof as it is wrapped upon the mandrel 21.

The rollers 32 and 42 are mounted on a bracket 44 movable radially of the mandrel 21 by a piston rod 45 movable by a hydraulic cylinder 46 mounted on the support 24. The rollers 39 and 41 are rotatably mounted adjacent the free end of a lever arm 47 which is pivoted at 48 upon an arm 49 rigidly mounted at one end on the carriage 16 so as to be movable therewith. The opposite end of the arm 49 is slidably supported at 50. The arm 47 and the bracket 44 are substantially aligned to move in opposite directions radially or transversely of the mandrel 21.

The tension band 35 in passing from the roller 39 to the roller 41 travels about a tensioning roller 51 rotatably mounted on the free end of an arm 52 which is aligned with the arm 47 and is also pivotally mounted on the carriage arm 49, as at 53. The arm 52 carries a hydraulic cylinder 54 movable therewith which controls a piston rod 55 pivotally connected to the arm 47 so that the hydraulic cylinder 54 controls the separation between the arms 47 and 52 as well as the tension placed on the tension band 35 by the roller 51 and the force exerted by the rollers 39 and 41 on the matrix tape. The tensioning roller 51 is desirably driven by a variable speed drive indicated diagrammatically at 56.

FIG. 2 illustrates fragmentarily the action by which the rotation of the mandrel 21 and the longitudinal movement of the carriage 16 helically winds the matrix tape 27 on the mandrel 21 in overlapped relation, with the outer layer 30 of the tape being engaged by the tension band 35 and the layers of the tape 27 beneath the tension band being subjected to pressure between the under surface of the band 35 and the outer surface of the mandrel 21. Heat for curing is imparted to the matrix tape both from the mandrel walls heated by the heater 23 and from the tension band heated by the heater 43, as noted above, the matrix tape itself having been advantageously preheated and softened by the heater 29.

The operation of the physical embodiment of FIG. 1 will now be described. The speeds at which the mandrel is rotated and the carriage 16 traversed will be influenced by the size and thickness of the structure to be molded as well as the materials of the fiber matrix tape and its binder, and will be governed by considerations hereinbefore pointed out to secure optimum consolidation and curing of the matrix materials. The matrix tape may vary widely as to dimensions, for example, up to ten inches wide or more, but more desirably is of a narrower width in the range of one inch to three inches and is preferably relatively thin, a suitable thickness, by way of example only, being one-sixteenth inch.

Taking from the examples previously given, a fiber glass matrix tape 27 impregnated with a phenolic binder may be supplied in a roll 26 and wrapped onto the outer surface of the mandrel 21. The mandrel is preheated by the heater 23 and the heater 29 preheats the tape 27 to soften the phenolic binder. The preheated tape will be relatively soft and too much force should not be exerted thereon which might distort it or pull it out of shape. If the pull from the mandrel back to the supply roll is too great, the roller 28 just ahead of the heater 29 may be power driven to lessen the tension on the heated tape. The tension band 35 is heated by the heater 43 before it and the tape 27 pass under the roller 32 and onto the surface of the mandrel 21, as in FIG. 2. To avoid pulling the band 35 by the heated tape 27, the rollers 51 and 37 are desirably driven by the variable speed drives 56 and 38, respectively, so that the tension band 35 moves about the mandrel 22 at substantially the same velocity as the outer layer 30 of the tape 27 being wound thereon.

The hydraulic cylinder 46 moves its piston rod 45 outwardly and bracket 44 forces the rollers 32 and 42 and the tension band passing therearound against the outer layer 30 of the matrix tape. The hydraulic cylinder 54 both applies pressure at the rollers 39 and 41 against the overlapped layers of the matrix tape under the tension band and also biases the arm 52 and the roller 51 away from the mandrel 21 so that tension is applied to the band 35 throughout its length and the band applies pressure to the overlapped matrix layers about substantially the entire circumference of the mandrel 21 therebeneath.

At the same time that the matrix tape 27 is being helically wrapped on the mandrel 21 by rotation thereof, the carriage 16 is moved longitudinally, parallel to the axis of rotation of the mandrel, by the lead screw 18. The speed of rotation of the lead screw 18 and the longitudinal movement of the carriage 16 will be determined by the width of the matrix tape 27 and the number of overlapped layers it is desired to place upon the mandrel. For example, with a one-inch tape and an overlap of ten layers of tape on the mandrel, the carriage shifting should be at the rate of one-tenth of an inch per revolution of the mandrel.

As the tape 27 is helically wrapped around the mandrel 21, it will be heated to curing temperature from both the interior by the heated mandrel 21 and from the exterior by the heated tension band 35 and the overlapped layers of the matrix tape beneath the tension band 35 will be placed under pressure between the band and the mandrel. The material of the tape is thereby consolidated to the desired final density and the matrix binder cured under heat and pressure, progressively along the length of the mandrel in the manner previously described. The pressure exerted by the tension band 35 should be such as to secure the desired consolidation and density of the matrix fibers; as an example only, of the order of 100-200 p.s.i. The elevated temperatures applied will be of an order to effect the progressive polymerization or curing within the minimum and maximum times set forth hereinbefore. Thus, such temperatures can be on the order, by way of example only, of from 275°-360° F.

FIG. 3 illustrates a missile or rocket nozzle having sections formed according to the present invention. Such nozzles take many physical configurations and may be formed of varied components and sections. Even where sectional arrangements are prescribed, as shown in FIG. 3, the present invention provides for the formation of monolithic, frusto-conical sections, in whole or in part, without the use of heavy hydroclaves, autoclaves or presses therefor. In some cases the smaller throat sections and inserts may be desirably constructed in matched metal molds and high pressure presses, but since these sections are relatively smaller, they do not involve the excessively heavy equipment required for the very large exit sections of the nozzle.

Referring specifically to FIG. 3, the nozzle is shown as comprised of an exterior metallic supporting structure made up of sections 61, 62 and 63 which may be bolted or otherwise secured together and in the main missile or rocket engine shell or case 64. Within the outer supporting sections 61 and 62 are disposed a nozzle approach or upstream section 65 and throat sections 66 and 67. Within the outer supporting section 63 is the long nozzle exit or aft section 68. The throat sections 66 and 67 are shown made up of mating outer and inner rings.

By way of example, the exit section 68 of the nozzle may be molded from fiber glass, phenolic resin binder tape that can be later overlaid in a conventional fashion with an epoxy resin coated high strength fiber glass winding $d$ while the inner rings of the throat sections 66 and 67 may be formed of graphite fiber or cloth matrix tape impregnated with a phenolic resin for greater erosion resistance at the higher temperatures to which it is subjected.

The thickness of the nozzle sections must allow for erosion, depth of char and a non-heat affected layer adjacent any supporting structure interface. The minimum thickness permissible with the above allowances is preferred for ease of fabrication, structural strength and low weight.

The inner and outer surfaces of the structure molded on the mandrel 21 are preferably machined, the inner surface for smoothness to facilitate flow of the rocket gases thereover, and the outer surface for attachment to the mechanical support. Where an overall thickness is desired greater than is provided by a single winding operation, a pair of concentric inner and outer impregnated tape elements $a$ and $b$ may be mechanically joined together by mating machined surfaces as indicated at 70 for the throat sections 67 of FIG. 3. The separate elements are formed with concentric ridges and inclined planes directed, as illustrated, to provide inter-engaging shoulders so that the inner element is prevented from being moved rearwardly with respect to the outer element by the thrust of the rocket gases thereon.

While the nozzle of FIG. 3 has been shown made up of a plurality of separate sections to illustrate a rather complex nozzle construction, it is plain that the structure molded on a mandrel 21 could be a complete nozzle as well as a nozzle liner or a nozzle part.

Outer strengthening for the nozzle, liner or part can be provided in many desirable ways, for example, by a solid outer metal shell, by fiber glass filaments or thread wound thereabout, by a metal honeycomb cemented to the exterior of the nozzle and provided with an outer winding of fiber glass filaments or threads, or by any other suitable mechanical construction.

The present invention may be utilized in the construction of any fiber matrix structure having a matrix binder, and in the field or rocket propulsion systems and re-entry vehicles may include, in addition to nozzles and nozzle sections and elements, thrust chamber insulation, and ablation heat shields and control surfaces for re-entry vehicles.

In the structural embodiment diagrammatically illustrated in FIGS. 4-6 a plurality of circumferentially disposed rollers 71-76 are rotatably mounted in frames 71'-76', respectively. The rollers 71-76 are illustrated as frusto-conical in form and engage a plurality of sidewise aligned endless cables 77 disposed to perform the function of the tension band 35 in the previous embodiment. It is to be understood that in any given tape winding operation a sufficient number of suitable rollers comparable to rollers 71-76 will be employed to prevent corrugating of the tape as it is applied to a mandrel. The cables 77 may be coated to provide a flat, flexible surface and engage the matrix tape 27 as more particularly shown in FIG. 6, which also illustrates a mandrel 78 on which the matrix tape 27 is helically wound to form a molded structure. The mandrel 78 is mounted to be rotated by a shaft 79 and the rollers 71-76 and the elements associated therewith are intended to be moved axially of the mandrel as it rotates in a manner similar to the traversing movement of the carriage 16. The details of this this structure have not been shown, as they are believed to be unnecessary to a diagrammatic representation of the distinctive features of the structural embodiment of FIGS. 4-6.

The upper rollers 71-73 are controlled by a pair of adjustable, constant torque rollers 81 and 82 and the lower rollers 74-76 are controlled by a pair of adjustable, constant torque rollers 83 and 84. FIG. 4 illustrates the control for the upper set of rollers in which three control cables 85, 86 and 87 are wound on the constant torque roller 81 and control cables 88, 89 and 90 are wound on the constant torque roller 82. The rollers 81-84 exert a constant adjusted torque and apply a constant tension to the control cables. Control cable 85 passes from roller 81 over the axle of roller 71 and is connected to the frame 72' at one side thereof, and control cable 90 is connected to the other side of the frame 72' and over the axle of roller 73 to the roller 82. Control cable 86 is connected from roller 81 to one side of the frame 71', and control cable 88 is connected from the other side of the frame 71' and thence over the axles of rollers 72 and 73 to torque roller 82. Control cable 89 connects roller 82 to the adjacent side of the frame 73', its opposite side being connected to control cable 87 and thence over the axles of rollers 71, 72 to roller 81. The rollers 71-76 thereby hold the cables 77 inwardly and maintain the alignment thereof about the periphery of the mandrel 78, the rollers being provided with peripheral flanges 91 at their outer edges (FIG. 6) to prevent sliding of the cables 77 off the smaller diameter ends of the rollers.

The cables 77 are shown as passing over outside rollers 92 of which no details are disclosed in the diagrammatic showing of FIG. 5. It will be understood that one or more of the rollers 92 may be power driven to move the cables 77 at the same speed as the tape 27. The peripheral rollers 93 may be pressed against the outer matrix tape layer by a hydraulic power cylinder 97. The peripheral rollers 98 are pressed against the outer tape layer by a hydraulic cylinder 99 which also moves a tensioning roller 100 outwardly to apply tension to the cables 77. The cylinder 99 has a pair of oppositely moving pistons therein to effect these movements of the rollers 98 and 100.

Figure 7:
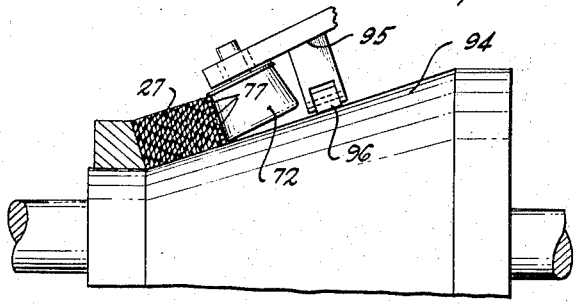
FIG. 7 is a diagrammatic representation of the operation of applying the matrix tape edgewise to a mandrel form.

FIG. 7 illustrates the edgewise winding of a matrix tape 27 on a rotating mandrel 94. It employs a roller and cable arrangement similar to that shown in FIG. 6, with the addition of a guide frame 95 having a supporting roller 96 running on the surface of the mandrel 94. The rollers, such as shown at 72, are thereby held in proper relation to the mandrel surface, with the cables 77 applying pressure to the tape layers substantially at right angles thereto and parallel to the mandrel surface.

While certain preferred aspects of the present invention have been specifically illustrated and described herein, it is understood that the invention is not limited thereto as many variations will be apparent to those skilled in the art, and the invention is to be given its broadest interpretation within the terms of the following claims.

What is claimed is:

1. The method of constructing a fiber matrix rocket nozzle structure which comprises: helically winding a continuous tape having unbroken longitudinal edges and of a fiber matrix material impregnated with an uncured matrix binder upon and along a rotating form in overlapped layers; continuously heating said form; applying a continuous band to the outer layer of tape being continuously wound upon and along the form; continuously heating said band; and uniformly tensioning said band to apply pressure to the tape layers between the band and the form to effect continuous, progressive, cross-layer curing of the matrix binder as the winding progresses along the form so as to produce a substantially monolithic rocket nozzle structure.

2. The method defined in claim 1 including the step of preheating the tape to soften the binder prior to winding the tape on the form.

3. The method of molding a substantially monolithic fiber matrix rocket nozzle structure which comprises: helically winding a continuous tape having unbroken longitudinal edges and of a fiber matrix material impregnated with an uncured matrix binder in overlapping layers upon and along a form; engaging the surface of the last wound layer of tape continuously with an endless tension band; moving the engaging surfaces of said tape and said band at substantially the same speed about and along the form; heating both said form and said band to apply heat to the overlapped layers of said tape from both the interior and exterior thereof; and tensioning said band at a series of points located at diametrically opposed sides of said form so as to apply substantially uniform pressure to the overlapped layers of said tape to effect continuous, progressive, cross-layer curing of the matrix binder under pressure as the winding progresses upon and along the form.

4. Apparatus for molding a fiber matrix rocket nozzle structure from a continuous tape of fiber matrix material impregnated with an uncured binder which comprises: a heated rotatable form, the exterior surface of which is adapted to mold the interior surface of said structure; a first means for supporting said form; a second means for supporting a supply of said tape; means for effecting rotation of said first and second mentioned supporting means relative to each other so as to wind said tape upon the exterior surface of said form; a further means for effecting relative longitudinal movement between said first and second mentioned supporting means during rotation thereof, whereby the tape is progressively overlapped and helically wound about and along the form surface; a continuous tension band engaging the last helically wound layer of said tape; pressure roller means disposed at a series of points located at diametrically opposed sides of said form for pressing said band against the surface of the last helically wound layer of tape at the points where the band engages and disengages the tape surface; and means for tensioning said band to apply pressure to the wound layers of tape therebeneath.

5. Apparatus for molding a fiber matrix rocket nozzle structure from a continuous tape of fiber matrix material impregnated with an uncured binder which comprises: a rotatable form, the exterior surface of which is adapted to mold the interior surface of said structure; a first means for supporting said form; a second means for supporting a supply of said tape; means for effecting rotation of said first and second mentioned supporting means relative to each other so as to wind said tape upon the exterior surface of said form; a further means for effecting relative longitudinal movement between said first and second mentioned supporting means during the rotation thereof whereby the tape is progressively overlapped and helically wound about and along the form surface; a continuous tension band engaging the last helically wound layer of said tape; roller means for tensioning said band to apply pressure to the overlapped and helically wound layers of said tape therebeneath, said roller means comprising individual rollers located at a series of points disposed at diametrically opposed sides of said form; means effecting movement of said band at the same velocity as said tape so that the adjacent surfaces of the form, tape and band have a substantially zero relative velocity therebetween; and means for heating the helically wound tape layers so as to effect continuous, progressive curing of the binder under pressure as the winding of the tape progresses along the form.

6. The apparatus defined in claim 4 including means for preheating said tape to soften said matrix binder prior to its being wound upon the form.

7. The apparatus defined in claim 4 in which said tension band is formed by a group of continuous cables disposed in substantially sidewise aligned relation.

8. The apparatus defined in claim 7 including: a plurality of rollers peripherally disposed about said form in circumferentially spaced relation; and means for pressing said rollers against the outer surfaces of said cables to assist and direct their pressure action against the tape layers.

References Cited

UNITED STATES PATENTS

| | | | |
|---|---|---|---|
| 1,921,516 | 8/1933 | Frederick | 156—446 X |
| 2,674,557 | 4/1954 | Boggs | 156—184 |
| 3,095,156 | 6/1963 | Warnken | 156—184 X |

EARL M. BERGERT, *Primary Examiner.*

P. DIER, *Assistant Examiner.*